(12) United States Patent
Al-Harbi

(10) Patent No.: US 11,970,748 B2
(45) Date of Patent: Apr. 30, 2024

(54) STEEL DECARBURIZATION USING CARBON DIOXIDE

(71) Applicant: SABIC Global Technologies B.V., Bergen op Zoom (NL)

(72) Inventor: Mansour Al-Harbi, Jubail (SA)

(73) Assignee: SABIC GLOBAL TECHNOLOGIES B.V., Bergen op Zoom (NL)

( * ) Notice: Subject to any disclaimer, the term of this patent is extended or adjusted under 35 U.S.C. 154(b) by 216 days.

(21) Appl. No.: 17/428,936

(22) PCT Filed: Feb. 12, 2020

(86) PCT No.: PCT/IB2020/051137
§ 371 (c)(1),
(2) Date: Aug. 5, 2021

(87) PCT Pub. No.: WO2020/165795
PCT Pub. Date: Aug. 20, 2020

(65) Prior Publication Data
US 2022/0136076 A1    May 5, 2022

Related U.S. Application Data

(60) Provisional application No. 62/805,051, filed on Feb. 13, 2019.

(51) Int. Cl.
*C21D 3/04* (2006.01)
(52) U.S. Cl.
CPC .................................. *C21D 3/04* (2013.01)
(58) Field of Classification Search
CPC .. C21D 3/04; C21C 5/52; C21C 7/072; C21C 7/10; C21C 7/068; Y02P 10/20

USPC ............................................................ 148/278
See application file for complete search history.

(56) References Cited

U.S. PATENT DOCUMENTS 5,693,120 A * 12/1997 Obana ................... C21C 7/10
75/384
2014/0260804 A1    9/2014 Matway

FOREIGN PATENT DOCUMENTS

| CN | 102146499 | | 8/2011 | |
|---|---|---|---|---|
| CN | 108330253 | | 7/2018 | |
| CN | 110684881 | A * | 1/2020 | .............. C21C 7/068 |
| DE | 4328045 | | 2/1995 | |
| EP | 0401530 | | 12/1990 | |
| EP | 2592160 | | 5/2013 | |
| JP | H 06330143 | | 11/1994 | |
| WO | WO 2015/074780 | | 5/2015 | |
| WO | WO2015/074780 | A1 * | 5/2015 | ............... C21C 3/35 |

OTHER PUBLICATIONS

WO2015/074780 A1 Translation (Year: 2015).*

(Continued)

*Primary Examiner* — Brian D Walck
*Assistant Examiner* — Danielle Carda
(74) *Attorney, Agent, or Firm* — Norton Rose Fulbright US LLP

(57) ABSTRACT

A process to decarburize steel can include contacting molten iron-containing material with a carbon dioxide in an electric arc furnace, a ladle furnace, or a vacuum degassing unit, or a combination thereof to decarburize at least a portion of the molten iron-containing material. The molten iron-containing material is preferably molten iron oxide.

19 Claims, 3 Drawing Sheets

(56) References Cited

OTHER PUBLICATIONS

Satyendra, Stainless Steel Manufacturing Processes, ISPAT GURU, May 4, 2014 (Year: 2014).*
CN-110684881-A Translation (Year: 2020).*
International Search Report and Written Opinion issued in International Application No. PCT/IB2020/051137, dated Apr. 9, 2020.
Office Action issued in corresponding Chinese Application No. 202080022221.2, dated Aug. 30, 2022.
Zhu Rong et al., Clean Smelting Technology of Electric Arc Furnace Steelmaking Process [J], Steelmaking, 34, (1): 10-19.

* cited by examiner

STEEL DECARBURIZATION USING CARBON DIOXIDE

CROSS REFERENCE TO RELATED APPLICATIONS

This application is a national phase under 35 U.S.C. § 371 of International Application No. PCT/IB2020/051137, filed Feb. 12, 2020, which claims the benefit of priority of U.S. Provisional Patent Application No. 62/805,051, filed Feb. 13, 2019, the contents of each of which are hereby incorporated into the present application in their entirety.

FIELD OF THE INVENTION

The invention generally concerns decarburization of steel. In particular, the invention concerns using carbon dioxide as an oxygen source for the decarburization of steel during one or more stages of steel making.

BACKGROUND OF THE INVENTION

Electric arc furnaces (EAFs) are used to make steel by using an electric arc to melt one or more charges of scrap metal placed in the furnace. In addition to the electrical energy of the arc, chemical energy is provided by auxiliary burners using fuel and an oxidizing gas to produce combustion products with a high heat content to assist the arc. In certain circumstances the scrap is dumped into the furnace through a roof opening from buckets which also may include charge carbon and slag forming materials. In certain instances the charge can include lime, dolomitic lime, and carbon, or these can be injected into the furnace during the heat. Some operations add some lime and carbon in the scrap bucket and supplement this with injection. In a direct reduced iron process, during the primary melting process in the EAF, and after flat bath conditions are reached, process oxygen injection in supersonic mode and carbon injection can be initiated. At a low bath level, when the oxygen introduction performance using supersonic nozzle is minimal, a relatively high initial carbon amount can accumulate in the bath and can lead to boiling and/or reaction later during the process. Furthermore, an excessive amount of oxygen can lead to overheating the bath, which affects the efficiency of the furnace.

In the melting phase, the electric arc and burners melt the charge into a molten pool of metal, called an iron-carbon melt, which accumulates at the bottom or hearth of the furnace. Typically, after a flat bath has been formed by melting of all the charge introduced, the electric arc furnace enters a refining and/or carburization/decarburization phase. In this phase, the metal continues to be heated by the arc until the slag forming materials that are present combine with impurities in the iron-carbon melt and rise to the surface as slag. When the iron-carbon melt reaches a boiling temperature, the charge carbon in the melt combines with any oxygen present in the bath to form carbon monoxide bubbles which rise to the surface of the bath causing the slag to foam.

A use of carbon injection is to foam the slag and reduce the FeO in the slag. Using a conventional burner/lance mounting configuration, a carbon injection stream is required to travel the same distance that a conventional oxygen jet must travel. Disruption of the carbon stream or inefficient carbon injection reduces the effectiveness of slag foaming. The large distance which the conventional carbon injection stream must travel also reduces the velocity and energy with which it may penetrate the slag.

Another problem with carbon injection by lance is, when mixed externally from the melt and slag, the oxygen and carbon combine to produce a flame leaving less carbon to foam the slag and reduce FeO in the slag.

The produced melt and slag can be processed further in a ladle furnace. In a ladle furnace, liquid steel can be reheated and the chemical composition of the molten metal can be adjusted. In a ladle furnace the temperature of the steel can be adjusted using electrical power. Typically, argon can be bubbled from the ladle bottom to circulate the steel and to improve heating efficiency. The required heating energy depends not only on the desired temperature increment, but also on the amount and thermal properties (specific heat) of the alloys which are added in the ladle. Typically, a ladle furnace is used to desulfurize the steel with slag, calcium-treat the steel, and perform other alloying and trimming additions.

The steel produced from a ladle furnace can be subjected to vacuum degassing. Vacuum degassing is a common metallurgical process in which molten metal (e.g., steel, iron, aluminum, and/or the like) disposed within a ladle is exposed to vacuum. In some instances, vacuum degassing may be enhanced by passing insert gasses such as argon (Ar) through the molten metal (e.g., to displace reactive gasses within the molten metal, encourage mixing of the molten metal, and/or the like). Vacuum degassing can be advantageously performed to remove reactive gasses, such as hydrogen, and/or undesired trace elements from molten metal, as well as limit oxidation of reactive elements and/or the formation of non-metallic oxide inclusion within the molten metal, which can ultimately provide for a better casting using the molten metal.

Thus, current steel making systems are not very efficient over much of the scrap-melting steel-making process and almost ineffective for many other conventional steel-making processes.

SUMMARY OF THE INVENTION

A discovery has been found that provides a solution to at least some of the problems associated with steel making. The solution is premised on providing $CO_2$ as an oxygen source during one or more stages of the steel making process. By way of example, $CO_2$ can be provided as an oxygen source in an electric arc furnace (EAF) when it is difficult to provide sufficient effective amount of oxygen from the top. Without wishing to be bound by theory it is believed that addition of $CO_2$ to the EAF can reduce the oxygen consumption rate and enhance the alloys addition yield due to the reduced oxygen level in the secondary processing (e.g., in the ladle furnace). In addition, the use of $CO_2$ can lead to a more energy efficient process due to the reduction in Tap-To-Tap time. Furthermore, addition of the $CO_2$ can start the decarburization of the steel at an early stage of the process.

In another example, $CO_2$ can be provided to the ladle furnace and/or vacuum degassing step. Addition of the $CO_2$ to the ladle furnace or the vacuum degassing unit can reduce the amount of oxygen required in the steel bath arriving the vacuum degassing unit to achieve the carbon target level. Furthermore, the use of $CO_2$/inert gas mix for stirring through a porous plug during the ladle furnace treatment can reduce the carbon level to a lower range for grades that do not require vacuum degassing treatment.

In one aspect of the present invention, processes to decarburize steel are described. A process can include contacting molten iron-containing material with a sufficient amount of carbon dioxide ($CO_2$) containing gas to decarburize at least a portion of the molten iron containing material. Contacting temperatures can be from 500 to 1000° C., or any range or value there between. The $CO_2$ containing gas can include argon (Ar), nitrogen ($N_2$) gases or any combination thereof. $CO_2$ contacting can occur during a primary steel processing step of melting direct reduced iron, pig iron, iron ore, scrap iron, or any combination thereof. The $CO_2$ containing gas can provided at a rate sufficient to agitate the iron-containing material. During the primary processing step, the molten iron-containing material can be contacted with oxygen ($O_2$) containing gas. Contact of the molten iron-containing material converts iron metal to iron oxide. When $O_2$ and $CO_2$ containing gases are used, the gases can be provided simultaneous or substantially simultaneous to the molten iron-containing material and/or from opposite directions. In some embodiments, contact of the iron-containing material and $CO_2$ containing gas is a secondary steel processing step. In such a process the iron-containing material can include molten slag on a top portion of a molten iron oxide material and the $CO_2$ containing gas can be provided to a bottom portion of the molten iron oxide material. The $CO_2$ containing gas can be provided at a rate sufficient to agitate the molten iron-containing material. In some embodiments, the iron-containing material is molten iron oxide and the molten iron oxide can be contacted with the $CO_2$ containing gas under a reduced pressure (e.g., a vacuum). For example, during a third steel processing step. the produced steel has a carbon content of less than 0.5 wt. %, preferably less than 0.25 wt. %, more preferably less than 0.05 wt. %. based on the total weight of the steel.

In another aspect of the present invention, a process to decarbonize iron-containing materials is described. The process can include (a) contacting an iron-containing material with a sufficient amount of carbon dioxide ($CO_2$) containing gas to at least partially decarbonize the iron-containing material, (b) providing the at least partially decarbonized iron-containing material to a secondary steel process and contacting the iron-containing material with a sufficient amount of $CO_2$ containing gas to produce a decarbonized iron containing material having a carbon content lower than the decarbonized iron-containing material of step (a), and (c) contacting the decarbonized iron containing material of step (b) with a $CO_2$ containing gas under a reduced pressure to produce a decarbonized steel material having a carbon content lower than the decarbonized iron containing material of step (b). Step (a) can be performed in an arc furnace, step (b) can be performed in a ladle furnace, and step (c) can be performed in a ladle vacuum degassing unit. The $CO_2$ containing gas can be provided to a bottom portion of the EAF, a bottom portion of the ladle furnace, a bottom portion of the ladle vacuum degassing unit, or any combination thereof. Contacting in step (a) can also include contacting the iron-containing material of step (a) with an oxygen containing gas. Such contact can occur simultaneous or substantially simultaneous during contact of the iron-containing material with the $CO_2$ containing gas. the decarbonized iron-containing material of step (b) and/or step (c) is a steel material having a carbon content of less than 0.5 wt. %, preferably less than 0.25 wt. %, more preferably less than 0.05 wt. %.

Other embodiments of the invention are discussed throughout this application. Any embodiment discussed with respect to one aspect of the invention applies to other aspects of the invention as well and vice versa. Each embodiment described herein is understood to be embodiments of the invention that are applicable to other aspects of the invention. It is contemplated that any embodiment or aspect discussed herein can be combined with other embodiments or aspects discussed herein and/or implemented with respect to any method or composition of the invention, and vice versa. Furthermore, compositions of the invention can be used to achieve methods of the invention.

The following includes definitions of various terms and phrases used throughout this specification.

The term "decarburization" refers to reduction of the carbon content in steel. Decarburization can be a surface degradation of steel in which the surface of steel is depleted of carbon, by heating above the lower critical temperature of the steel and/or by chemical action.

The term "steel" refers to an alloy of iron, carbon and optionally other elements (e.g., nickel, chromium, manganese, vanadium, silicon, boron, aluminum, cobalt, copper, cerium, niobium, titanium, tungsten, tin, zinc, lead, zirconium or any combination thereof). The terms steel, alloy steel, and/or steel alloy can be used interchangeably throughout the specification.

The terms "about" or "approximately" are defined as being close to as understood by one of ordinary skill in the art. In one non-limiting embodiment, the terms are defined to be within 10%, preferably within 5%, more preferably within 1%, and most preferably within 0.5%.

The terms "wt. %", "vol. %", or "mol. %" refers to a weight percentage of a component, a volume percentage of a component, or molar percentage of a component, respectively, based on the total weight, the total volume of material, or total moles, that includes the component. In a non-limiting example, 10 grams of component in 100 grams of the material is 10 wt. % of component.

The term "substantially" and its variations are defined to include ranges within 10%, within 5%, within 1%, or within 0.5%.

The terms "inhibiting" or "reducing" or "preventing" or "avoiding" or any variation of these terms, when used in the claims and/or the specification includes any measurable decrease or complete inhibition to achieve a desired result.

The term "effective," as that term is used in the specification and/or claims, means adequate to accomplish a desired, expected, or intended result.

The use of the words "a" or "an" when used in conjunction with any of the terms "comprising," "including," "containing," or "having" in the claims, or the specification, may mean "one," but it is also consistent with the meaning of "one or more," "at least one," and "one or more than one."

The words "comprising" (and any form of comprising, such as "comprise" and "comprises"), "having" (and any form of having, such as "have" and "has"), "including" (and any form of including, such as "includes" and "include") or "containing" (and any form of containing, such as "contains" and "contain") are inclusive or open-ended and do not exclude additional, unrecited elements or method steps.

The processes of the present invention can "comprise," "consist essentially of," or "consist of" particular ingredients, components, compositions, etc. disclosed throughout the specification. With respect to the transitional phrase "consisting essentially of," in one non-limiting aspect, a basic and novel characteristic of a decarburization process of the present invention is the ability to reduce the carbon level of steel by contacting molten steel in an EAF, a ladle furnace, a vacuum degassing ladle or any combination thereof with $CO_2$.

In the context of the present invention, at least twenty embodiments are now described. Embodiment 1 is a process to decarburize steel. The process includes the steps of contacting molten iron-containing material with a sufficient amount of carbon dioxide ($CO_2$) containing gas to decarburize at least a portion of the molten iron containing material. Embodiment 2 is the process of embodiment 1, wherein the contacting comprises a temperature of temperature of 500 to 1000° C. Embodiment 3 is the process of any one of embodiments 1 to 2, wherein the $CO_2$ containing gas is provided during a primary steel processing step of melting direct reduced iron, pig iron, iron ore, scrap iron, or any combination thereof. Embodiment 4 is the process of embodiments 1 to 2, further comprising providing the $CO_2$ containing gas at a rate sufficient to agitate the iron-containing material. Embodiment 5 is the process of embodiments 1 to 3, further comprising contacting the iron-containing material with an oxygen ($O_2$) containing gas. Embodiment 6 of embodiment 5, further comprising providing the $CO_2$ containing gas in a direction opposite of the flow the oxygen ($O_2$) containing gas. Embodiment 7 is the process of any one of embodiments 1 to 6, wherein the contact of the iron-containing material and $CO_2$ containing gas is a secondary steel processing step. Embodiment 8 is the process of embodiment 7, wherein the iron-containing material comprises molten slag on a top portion of a molten iron oxide material and the method further comprises providing the $CO_2$ containing gas to a bottom portion of the molten iron oxide material. Embodiment 9 is the process of embodiments 7 and 8, further comprising providing the $CO_2$ containing gas at a rate of sufficient to agitate the molten iron-containing material. Embodiment 10 is the process of embodiments 1 to 9, wherein the iron-containing material is molten iron oxide and the process further comprises contacting the molten iron oxide material and $CO_2$ containing gas under a reduced pressure. Embodiment 11 is the process of embodiment 10, wherein the reduced pressure is a third steel processing step. Embodiment 12 is the process of embodiment 10, further comprising providing the $CO_2$ containing gas at a rate of sufficient to agitate the molten iron oxide material. Embodiment 13 is the process of claims 1 to 12, wherein the $CO_2$ containing gas comprises nitrogen ($N_2$), argon (Ar), or both. Embodiment 14 is the process of any one of embodiments 1 to 12, further comprising producing a steel material from the decarburized iron-containing material, wherein the steel material has a carbon content of less than 0.5 wt. %, preferably less than 0.25 wt. %, more preferably less than 0.05 wt. %. based on the total weight of the steel.

Embodiment 15 is a process to decarbonize iron-containing material. The process includes the steps of contacting an iron-containing material with a sufficient amount of carbon dioxide ($CO_2$) containing gas to at least partially decarbonize the iron-containing material; providing the at least partially decarbonized iron-containing material to a secondary steel process and contacting the iron-containing material with a sufficient amount of $CO_2$ containing gas to produce a decarbonized iron containing material having a carbon content lower than the decarbonized iron-containing material of step (a); and contacting the decarbonized iron containing material of step (b) with a $CO_2$ containing gas under a reduced pressure to produce a decarbonized steel material having a carbon content lower than the decarbonized iron containing material of step (b). Embodiment 16 is the process of embodiment 15, wherein step (a) is performed in an arc furnace, step (b) is performed in a ladle furnace, and step (c) is performed in a ladle vacuum degassing unit. Embodiment 17 is the process of any one of embodiments 15 to 16, wherein the decarbonized iron-containing material of step (b) and/or step (c) is a steel material having a carbon content of less than 0.5 wt. %, preferably less than 0.25 wt. %, more preferably less than 0.05 wt. %. Embodiment 18 is the process of any one of embodiments 15 to 16, further comprising contacting the iron-containing material of step (a) with an oxygen containing gas. Embodiment 19 is the process of embodiment 18, further comprising simultaneous or substantially simultaneous contacting the iron-containing material with the $CO_2$ containing gas and the $O_2$ containing gas. Embodiment 20 is the process of embodiment 16, further comprising providing the $CO_2$ containing gas to a bottom portion of the EAF, a bottom portion of the ladle furnace, a bottom portion of the ladle vacuum degassing unit, or any combination thereof.

Other objects, features and advantages of the present invention will become apparent from the following figures, detailed description, and examples. It should be understood, however, that the figures, detailed description, and examples, while indicating specific embodiments of the invention, are given by way of illustration only and are not meant to be limiting. Additionally, it is contemplated that changes and modifications within the spirit and scope of the invention will become apparent to those skilled in the art from this detailed description. In further embodiments, features from specific embodiments may be combined with features from other embodiments. For example, features from one embodiment may be combined with features from any of the other embodiments. In further embodiments, additional features may be added to the specific embodiments described herein.

BRIEF DESCRIPTION OF THE DRAWINGS

Advantages of the present invention may become apparent to those skilled in the art with the benefit of the following detailed description and upon reference to the accompanying drawings.

Figure 1:
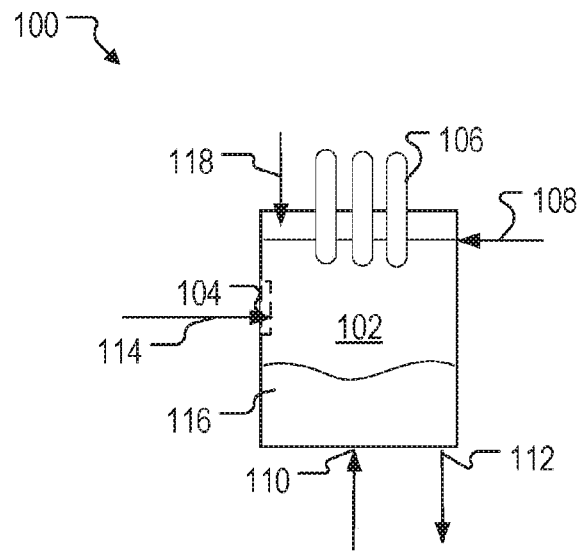
FIG. 1 shows an illustration of a process of the present invention for addition of $CO_2$ to an EAF.

While the invention is susceptible to various modifications and alternative forms, specific embodiments thereof are shown by way of example in the drawings. The drawings may not be to scale.

DETAILED DESCRIPTION OF THE INVENTION

A discovery has been made that provides a solution to at least some of the problems associated with the reduction of the carbon content in steel (i.e., decarburization of the steel). The addition of $CO_2$ can provide a more energy efficient process as it reduces the need for oxygen in one or more processing steps to produce steel.

These and other non-limiting aspects of the present invention are discussed in further detail in the following sections with reference to FIGS. 1-4.

FIG. 1 depicts a schematic for a system to produce molten steel in an electric arc furnace (EAF). System 100 can include EAF 102, Iron-containing material inlet 104, electrodes 106, oxygen containing gas inlet 108, $CO_2$ containing gas inlet 110, and molten steel outlet 112.

Iron-containing material 114 can enter EAF 102 through inlet 104. Iron-containing material can be any type of iron-based material (e.g., direct reduced iron (DRI, 80% $Fe_2O_3$), scrap metal, pig iron, etc.). In a preferred embodiment, the iron-based material is DRI. In EAF 102, iron-containing material 114 is heated to a temperature sufficient to melt the steel precursor material using electrodes 106 to form a molten steel. By way of example, electrodes 106 can be lowered onto the steel precursor material, an arc is struck and the electrodes are then set to bore into the layer of shred at the top of the furnace. Lower voltages can be selected for this first part of the operation to protect the roof and walls from excessive heat and damage from the arcs. Once electrodes 106 have reached the heavy melt at the base of the furnace and the arcs are shielded by the steel precursor material, the voltage can be increased and the electrodes raised slightly, lengthening the arcs and increasing power to the melt. This enables a molten pool to form more rapidly, reducing tap-to-tap times. During the melting process oxygen can enter EAF 102 through oxygen inlet 108 and be blown into the iron-containing material 116, combusting or cutting the material. Oxygen inlet 108 can include supersonic nozzles to enable oxygen jets to penetrate foaming slag and reach the molten iron-containing material. Carbon particles can be introduced to the molten iron-containing material via carbon inlet 118. Addition of carbon to the iron-containing material can provide additional source of carbon and produce an iron-carbon material that can be further processed to produce steel. The addition of carbon to the iron oxide can increase the amount of carbon in the molten iron-oxide/carbon mixture. Increased carbon content in a final steel product can result in the steel being brittle and/or have other undesirable properties. Thus, after the addition of carbon, a portion of the carbon in the iron-carbon alloy is removed.

During the addition of $O_2$, and optionally after the addition of carbon, $CO_2$ containing gas can enter EAF 102 through $CO_2$ inlet 110 (e.g., a porous plug in the bottom of the EAF). The $CO_2$ containing gas can include argon and/or nitrogen gases. During the initial addition of $O_2$ and the melting process, a stream of inert gas absent $CO_2$ can be enter EAF 102 through inlet 110. $CO_2$ can then be introduced over time. The $CO_2$ containing gas can be provided to EAF 102 at a rate sufficient to agitate the iron-containing material. Since the $CO_2$ is a source of oxygen, the amount of oxygen provided to EAF 102 can be lowered or be used to overcome difficulties in providing an effective amount of oxygen from the top. This provides the advantages of reduced oxygen consumption rate and can enhance the alloys addition yield due to the reduced oxygen opening ppm level in further processing steps (e.g., the ladle furnace). A further advantage to the addition of $CO_2$ is that it can lead in overall energy consumption optimization due to the potential reduction in Tap-To-Tap time as a result of early refining, bath robust stirring, and optimized foamy slag. Furthermore, addition of $CO_2$ can initiate decarburization of the molten steel. After heating for a desired period of time, partially decarburized iron containing material can exit EAF 102 through outlet 112 to be further processed through one or more additional steel processing steps or provided to a forming unit.

Figure 2:
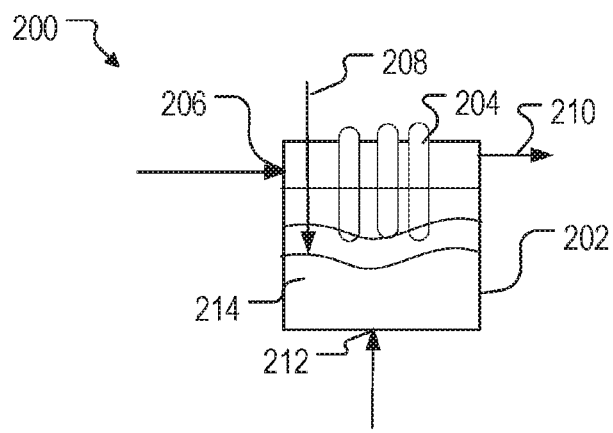
FIG. 2 shows an illustration of a process of the present invention for addition of $CO_2$ to a ladle furnace.

FIG. 2 depicts a schematic for a system for refinement of steel from an EAF. System 200 can include a ladle furnace 202. Ladle furnace 202 can include heating source 204 (e.g., electrodes), molten steel inlet 206 (e.g., a hopper), additive inlet 208, treated iron-containing material outlet 210, and $CO_2$ containing gas inlet 212. Ladle furnace 202 can receive molten iron-containing material via inlet 206. In some embodiments, partially decarburized molten iron-containing material 116 from EAF 102 enters ladle furnace 202. In ladle furnace 202, molten iron-containing material 214 can be further refined (e.g., treated and/or additized) to produce desired grades of steel. Molten iron-containing material 214 can be heated using heat source 204 and additives (e.g., sources of nickel, chromium, manganese, vanadium, silicon, boron, aluminum, cobalt, copper, cerium, niobium, titanium, tungsten, tin, zinc, lead, zirconium or any combination thereof) can be added into the molten iron-containing material through additive inlet 208. Additives can include other metal sources to produce steel alloys. During treatment, $CO_2$ containing gas can enter ladle furnace 202 via $CO_2$ inlet 212. In some embodiments, $CO_2$ inlet 212 is a porous plug. $CO_2$ containing gas can include $CO_2$ and argon. Addition of $CO_2$ can decarburize iron-containing material 216. In some embodiments, the decarburized iron-containing material has a carbon content less than the partially decarburized iron-containing material 112 from EAF 202. Addition of the $CO_2$ containing gas can also provide agitation of iron-containing material 214. In some embodiments, decarburization of the iron-containing material using $CO_2$ can lower the carbon level to an extent that vacuum gassing treatment is not necessary. Treated molten iron-containing material can exit ladle furnace 202 via treated iron-containing material outlet 210. In some embodiments treated molten iron-containing material is fully decarburized.

Figure 3:
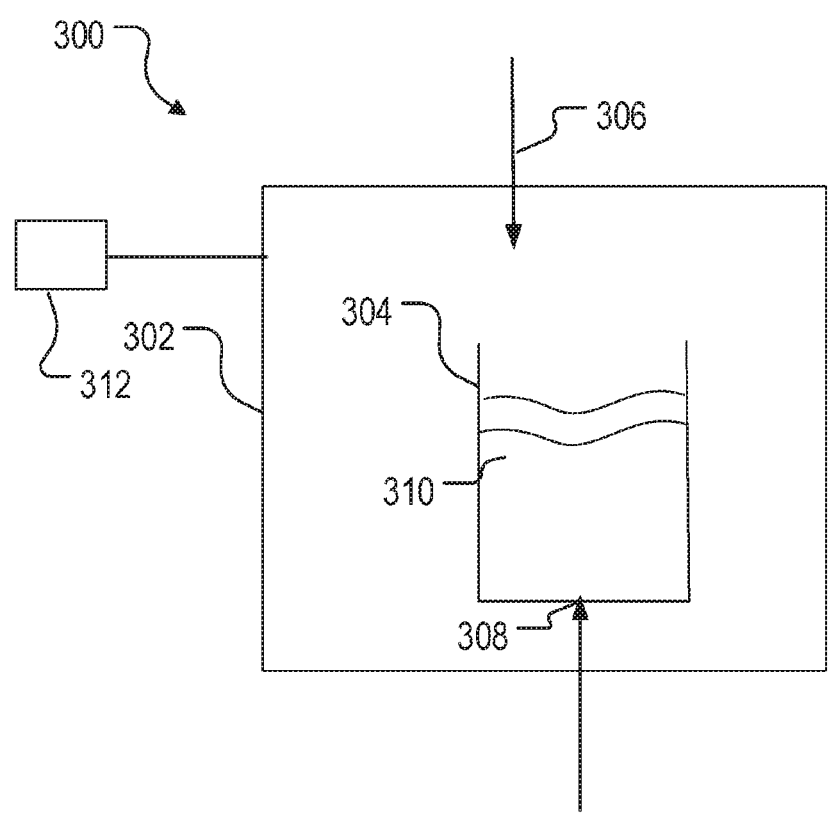
FIG. 3 shows an illustration of a process of the present invention for addition of $CO_2$ to vacuum degassing unit.

FIG. 3 is a schematic of a system for vacuum degassing of molten iron-containing material. Vacuum degassing can remove unwanted materials (e.g., $H_2$ and $N_2$) from the iron-containing material and/or add metals or alloys to the iron-containing material to produce steel or steel alloys having desired compositions and physical properties. $H_2$ and $N_2$ gases can both harm the properties of steel so removal of these gases is desirable. By way of example, solubility of $H_2$ in steel is low at ambient temperature so excess $H_2$ can be rejected during solidification; resulting in pinhole formation, which increases the porosity in solidified steel. Few ppm (parts per million) of $H_2$ gas can cause blistering and loss of tensile ductility. In case of $N_2$ gas, maximum solubility of $N_2$ in liquid iron is 450 ppm and less than 10 ppm at room temperature. During solidification excess $N_2$ can be rejected, which can cause formation of either blow holes or nitrides. Excess $N_2$ can also causes embrittlement of heat affected zone during welding of steels and also impairs cold formability of steel.

Vacuum degassing system 300 can include vacuum chamber 302, ladle 304, additive inlet 306, and $CO_2$ containing gas inlet 308. In system 300, ladle 304 can be filled with iron-containing material 310 and placed in vacuum chamber 302. In some embodiments, ladle 304 is in vacuum chamber 302 and molten iron-containing material 310 is added to the ladle. Molten iron-containing material 310 can be decarburized or partially decarburized iron-containing material 212 from ladle furnace 202. In some embodiments, molten iron-containing material 310 has not been treated with $CO_2$. Vacuum can be applied to vacuum chamber using vacuum source 312, and $H_2$ and $N_2$ can be removed from molten steel 310. During the degassing process, a $CO_2$ containing gas can be provided to molten iron-containing material 310 via $CO_2$ containing gas inlet 308 (e.g., a porous plug). Sparging of the molten iron-containing material can assist in removing of harmful gases while decarburizing the iron-containing material. In addition to decarburizing iron-containing material, additives (e.g., sources of nickel, chromium, manganese, vanadium, silicon, boron, aluminum, cobalt, copper, cerium, niobium, titanium, tungsten, tin, zinc, lead, zirconium or any combination thereof) can be added under vacuum via additive inlet 306 to the molten iron-containing material. After the iron-containing material has been treated to produce steel or steel alloys of the desired amount of carbon and other additives, the vacuum can be released and the molten steel can be poured from the ladle into molds or other processing equipment to form steel-based products.

Figure 4:
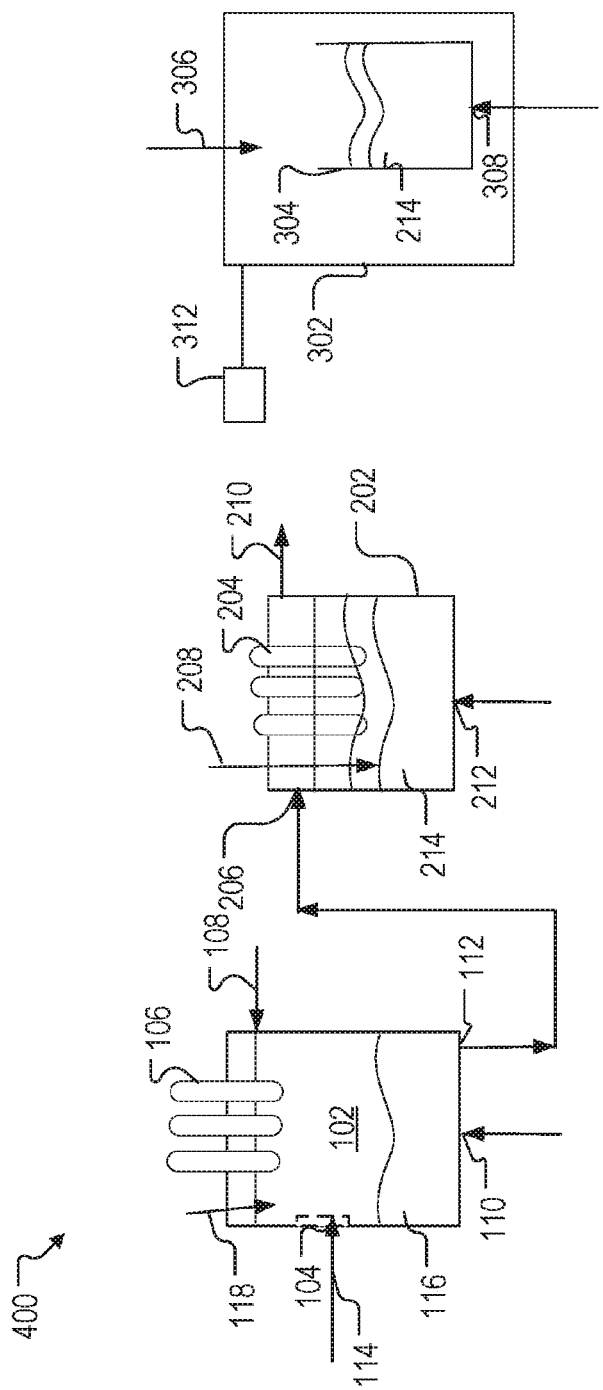
FIG. 4 shows an illustration of a process of the present invention for addition of $CO_2$ to an EAF, a ladle furnace, and a degassing unit.

FIG. 4 shows a schematic of system 400 which includes EAF system 100, ladle furnace system 200, and vacuum degassing system 300. System 400 provides a process to applying $CO_2$ to all three stages of the steel making process to produce decarburized steel. As shown in system 400, molten iron-containing material 116 is treated with $CO_2$ in EAR 102 to at least partially decarburize the iron-containing material, transferred to ladle furnace 202 where it is further treated with $CO_2$ to produce decarburized or substantially decarburized iron-containing material 214, which is then transferred to vacuum degassing system 300 and degassed and fully decarburized with $CO_2$ to produce steel having desired carbon levels and other properties. In system 400, a portion of treated steel 214 can be used as is and not further treated with $CO_2$ in vacuum degassing chamber 302.

The steel produced from the process of the present invention contains 0.0 wt. % to 0.5 wt. % of carbon, or less than any one of, equal to any one of, or between any two of 0.5, 0.4, 0.3, 0.2, 0.1, 0.09, 0.08, 0.07, 0.06, 0.05, 0.04, 0.03, 0.02, 0.01, 0.009, 0.008, 0.007, 0.006, 0.005, 0.004, 0.003, 0.002, 0.001 and 0 wt. % based on the total weight of the steel material.

Systems 100-400 can include one or more heating and/or cooling devices (e.g., insulation) or controllers (e.g., computers, flow valves, automated values, etc.) that can be used to control the temperature and pressure of the molten iron-containing material. While only one unit (e.g., furnace or ladle) is shown, it should be understood that multiple units can be housed in one unit or a plurality of units housed in one facility or system. In systems 100 to 400, the iron-containing material in the EAF, ladle furnace, ladle in vacuum degassing unit can be heated to a temperature of 500 to 1000° C., or at least any one of, equal to any one of, or between any two of 500, 550, 600, 650, 700, 750, 800, 850, 900, 950 and 1000° C. Gases provided to the EAF, ladle furnace, and vacuum degassing unit can be at rates suitable to the size of the equipment. Persons knowledgeable in the area of steel making can adjust the gas flow rates for optimal agitation and/or delivery of the desired gas.

Although embodiments of the present application and their advantages have been described in detail, it should be understood that various changes, substitutions and alterations can be made herein without departing from the spirit and scope of the embodiments as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the above disclosure, processes, machines, manufacture, compositions of matter, means, methods, or steps, presently existing or later to be developed that perform substantially the same function or achieve substantially the same result as the corresponding embodiments described herein can be utilized. Accordingly, the appended claims are intended to include within their scope such processes, machines, manufacture, compositions of matter, means, methods, or steps.

The invention claimed is:

1. A process to decarburize steel, the process comprising:
contacting a molten iron-containing material with a carbon dioxide ($CO_2$) containing gas to decarburize at least a portion of the molten iron-containing material; and
producing a steel material from the decarburized iron-containing material;
wherein the steel material has a carbon content of less than 0.5 wt. % based on the total weight of the steel; and
wherein the molten iron-containing material is molten iron oxide.

2. The process of claim 1, further comprising the step of introducing carbon particles to the molten iron-containing material via a carbon inlet.

3. The process of claim 1, wherein the $CO_2$ containing gas is provided during a primary steel processing step of melting direct reduced iron, pig iron, iron ore, scrap iron, or any combination thereof.

4. The process of claim 1, further comprising agitating the molten iron containing material with the $CO_2$ containing gas.

5. The process of claim 1, further comprising contacting the molten iron-containing material with an oxygen ($O_2$) containing gas.

6. The process of claim 5, further comprising providing the $CO_2$ containing gas in a direction opposite of the flow the oxygen ($O_2$) containing gas.

7. The process of claim 1, wherein the contact of the molten iron-containing material and $CO_2$ containing gas is a secondary steel processing step.

8. The process of claim 7, wherein the molten iron-containing material comprises molten slag on a top portion of a molten iron oxide material and the method further comprises providing the $CO_2$ containing gas to a bottom portion of the molten iron oxide material.

9. The process of claim 1, wherein the molten iron-containing material is molten iron oxide and the process further comprises contacting the molten iron oxide material and $CO_2$ containing gas under a reduced pressure.

10. The process of claim 9, wherein the reduced pressure is a third steel processing step.

11. The process of claim 9, further comprising agitating the molten iron oxide with the $CO_2$ containing gas.

12. The process of claim 1, wherein the $CO_2$ containing gas includes nitrogen ($N_2$), argon (Ar), or both.

13. A process to decarbonize iron-containing material, the process comprising:
(a) contacting an iron-containing material with a carbon dioxide ($CO_2$) containing gas to at least partially decarbonize the iron-containing material;
(b) providing the at least partially decarbonized iron-containing material to a secondary steel process and contacting the iron-containing material with a $CO_2$ containing gas to produce a decarbonized iron containing material having a carbon content lower than the decarbonized iron-containing material of step (a); and
(c) contacting the decarbonized iron containing material of step (b) with a $CO_2$ containing gas under a reduced pressure to produce a decarbonized steel material having a carbon content lower than the decarbonized iron containing material of step (b);

wherein the decarbonized iron-containing material of step (b) and/or step (c) is a steel material having a carbon content of less than 0.5 wt %.

14. The process of claim 13, wherein step (a) is performed in an electric arc furnace, step (b) is performed in a ladle furnace, and step (c) is performed in a ladle vacuum degassing unit.

15. The process of claim 14, further comprising providing the $CO_2$ containing gas to a bottom portion of the EAF, a bottom portion of the ladle furnace, a bottom portion of the ladle vacuum degassing unit, or any combination thereof.

16. The process of claim 13, wherein the decarbonized iron-containing material of step (b) and/or step (c) is a steel material having a carbon content of less than 0.05 wt.

17. The process of claim 13, further comprising contacting the iron-containing material of step (a) with an oxygen containing gas.

18. The process of claim 17, further comprising simultaneous or substantially simultaneous contacting the iron-containing material with the $CO_2$ containing gas and the $O_2$ containing gas.

19. A process to decarburize steel, the process comprising:
producing a decarburized iron-containing material by decarburizing at least a portion of molten iron-containing material which comprises carbon by contacting the molten iron-containing material with a carbon dioxide ($CO_2$) containing gas; and
producing a steel material from the decarburized iron-containing material;
wherein the steel material has a carbon content of less than 0.5 wt. % based on the total weight of the steel; and
wherein a vacuum gassing treatment is not necessary to yield the steel material.

* * * * *